United States Patent
Jung et al.

(10) Patent No.: US 12,389,827 B2
(45) Date of Patent: Aug. 19, 2025

(54) DAMPING OF PITCHING OSCILLATIONS OF A WORKING VEHICLE BY CHANGING THE SPEED AND ADJUSTING AN IMPLEMENT TAKING INTO CONSIDERATION THE OPERATING MODE

(71) Applicant: DEERE & COMPANY, Moline, IL (US)

(72) Inventors: Benedikt Jung, Kaiserslautern (DE); Martin Seimetz, Heusweiler (DE)

(73) Assignee: Deere & Company, Moline, IL (US)

( * ) Notice: Subject to any disclaimer, the term of this patent is extended or adjusted under 35 U.S.C. 154(b) by 688 days.

(21) Appl. No.: 17/205,253

(22) Filed: Mar. 18, 2021

(65) Prior Publication Data

US 2021/0289702 A1 Sep. 23, 2021

(30) Foreign Application Priority Data

Mar. 19, 2020 (DE) .......................... 102020203524.5

(51) Int. Cl.
| | | |
|---|---|---|
| *A01D 41/127* | (2006.01) | |
| *A01B 63/02* | (2006.01) | |
| *A01D 75/00* | (2006.01) | |
| *A01D 41/02* | (2006.01) | |

(52) U.S. Cl.
CPC .......... *A01D 41/1274* (2013.01); *A01B 63/02* (2013.01); *A01D 75/00* (2013.01); *A01D 41/02* (2013.01)

(58) Field of Classification Search
CPC .... A01B 63/02; A01D 41/02; A01D 41/1274; A01D 75/00
See application file for complete search history.

(56) References Cited

U.S. PATENT DOCUMENTS

| | | | | |
|---|---|---|---|---|
| 2003/0204297 A1* | 10/2003 | Griffith | ..................... | E02F 3/84 |
| | | | | 701/50 |
| 2008/0257569 A1* | 10/2008 | Foster | .................. | A01B 63/145 |
| | | | | 172/7 |
| 2009/0000156 A1* | 1/2009 | Hartwick | .................. | E02F 9/26 |
| | | | | 180/6.7 |
| 2009/0277145 A1* | 11/2009 | Sauerwein | ........... | A01D 41/141 |
| | | | | 56/208 |
| 2014/0350801 A1 | 11/2014 | Bonefas | | |
| 2016/0280221 A1* | 9/2016 | Jung | ..................... | B60W 30/02 |

(Continued)

FOREIGN PATENT DOCUMENTS

| | | |
|---|---|---|
| DE | 3446811 A1 | 7/1986 |
| DE | 102010017459 A1 | 12/2011 |

(Continued)

*Primary Examiner* — Aryan E Weisenfeld
(74) *Attorney, Agent, or Firm* — HANLEY, FLIGHT & ZIMMERMAN, LLC (57) ABSTRACT

An apparatus for damping a pitching oscillation of a working vehicle comprising: a first actuator for adjusting a position of an implement couple to the working vehicle; a second actuator for adjusting a propulsion rate of the working vehicle; and a control device in communication with the first and second actuators, the control device configured to receive an operating mode signal corresponding to an operating mode of at least one of the working vehicle and implement, and to generate control signals to the first actuator and the second actuator as a function of the operating mode signal.

21 Claims, 4 Drawing Sheets

(56) References Cited

U.S. PATENT DOCUMENTS

| | | | |
|---|---|---|---|
| 2017/0245434 A1* | 8/2017 | Jung | A01B 63/008 |
| 2020/0077584 A1* | 3/2020 | Miller | A01D 41/145 |
| 2020/0359547 A1* | 11/2020 | Sakaguchi | B60W 50/082 |

FOREIGN PATENT DOCUMENTS

| | | |
|---|---|---|
| DE | 102013213588 A1 | 1/2015 |
| DE | 102014203005 B3 | 5/2015 |
| DE | 102014205233 A1 | 9/2015 |
| DE | 102014208070 A1 | 12/2015 |
| EP | 0760200 A1 | 3/1997 |
| EP | 1743823 A1 | 1/2007 |
| EP | 3072379 A1 | 9/2016 |
| WO | 2013151619 A2 | 10/2013 |

* cited by examiner

DAMPING OF PITCHING OSCILLATIONS OF A WORKING VEHICLE BY CHANGING THE SPEED AND ADJUSTING AN IMPLEMENT TAKING INTO CONSIDERATION THE OPERATING MODE

RELATED APPLICATIONS

This document claims priority based on German Patent Application No. 102020203524.5, filed on Mar. 19, 2020, which is hereby incorporated by reference into this application.

DESCRIPTION

The disclosure relates to an arrangement for damping a potential pitching oscillation of a working vehicle by adjusting at least one of the speed of the working vehicle and an implement associated with the working vehicle.

BACKGROUND

Agricultural or other working vehicles generally comprise implements which are adjustable, i.e. are linearly displaceable or pivotable, by assigned actuators relative to the working vehicle. In the case of a tractor, this may include an implement attached to a front or rear power lift of a tractor, for example for ground cultivation, for sowing or for spreading fertilizer or other chemicals, in the case of a field sprayer which is built-on, towed or self-propelled a spraying boom which is height-adjustable and/or pivotable about an axis extending in the forward direction, in the case of a combine harvester or forage harvester a harvesting attachment which for the height adjustment is pivotable about a horizontal axis oriented transversely to the forward direction (generally the rotational axis of an upper feeder house roller and/or chopper drum) and/or for the parallel alignment on a slope is pivotable about an axis extending in the forward direction, or a discharge spout of a forage harvester which is height-adjustable about a horizontal axis and/or height adjustable about the vertical axis for the height adjustment of its outlet end. The target position of the actuator and thus of the adjustable implement is predetermined by an operator via a suitable interface or by an automatic control device cooperating with sensors.

Since the working vehicle is generally supported by air-filled (and thus resiliently flexible) tires on the soil and/or may be provided with a suspension system between the wheels or crawler track assemblies and the body of the working vehicle, the system consisting of the adjustable implement and the working vehicle is excited with each adjustment of the actuator to a pitching oscillation (pitching) which may have a disturbing effect during operation. For example, some implements may have a width of 12 meters or more and are guided at heights of a few centimeters above the ground and a desired cutting height may not be maintained due to the oscillation produced during the height adjustment. Additionally, the larger harvesting attachments lead to a more top-heavy loading of the harvesting machine. Moreover, due to the flexible tires and/or the suspension system the working vehicle is excited to pitching oscillations if the working vehicle changes its travel speed, automatically or based on a user input, or travels over uneven ground. Even in transport mode, the handling of the machines is impeded by the top-heavy loading, insofar as for transport on a road the harvesting attachment is pivoted into a configuration of reduced width and remains on the front face of the harvesting machine.

SUMMARY

An apparatus for damping a pitching oscillation of a working vehicle comprising: a first actuator for adjusting a position of an implement couple to the working vehicle; a second actuator for adjusting a propulsion rate of the working vehicle; and a control device in communication with the first and second actuators, the control device configured to receive an operating mode signal corresponding to an operating mode of at least one of the working vehicle and implement, and to generate control signals to the first actuator and the second actuator as a function of the operating mode signal.

A non-transitory computer-readable storage medium comprising computer program instructions for damping a pitching oscillation of a working vehicle that, when executed by a computer processor, cause the processor to: generate an operating mode signal corresponding to an operating mode of the working vehicle; generate a control signal using the operating mode signal and transmitting the control signal to a first actuator, the first actuator adjusting a position of an implement coupled to the working vehicle; and generate a control signal using the operating mode signal and transmitting the control signal to a second actuator, the second actuator adjusting a propulsion rate of the working vehicle.

DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

The damping of the pitching oscillations is often carried out by activating an actuator for adjusting the position of a movable implement of an agricultural working machine and/or controlling the propulsion rate, either only in field mode (German Patent Appl. No. DE 10 2010 017 459 A1, German Patent Appl. No. DE 10 2014 203 005 B3, German Patent Appl. No. DE 10 2014 208 070 A1, European Patent Appl. No. EP 3 072 379 A1), whilst for transport of the working machine on a road the movable implement is dismantled or blocked thereon, or only in transport mode (German Patent Appl. No. DE 34 46 811 A1). Thus in at least one of the operating modes no optimal damping of the pitching oscillations takes place.

The present disclosure provides an arrangement for damping a potential pitching oscillation of a working vehicle in which certain drawbacks are avoided or reduced. The arrangement provided may dampen a possible pitching oscillation of a working vehicle, which is supported by resilient elements on the ground, by identifying an anticipated and/or existing pitching oscillation of the working vehicle using, in part, a control device which is connected in a signal-transmitting manner for identifying the pitching oscillation, a first actuator for adjusting the position of an implement which is movably coupled to the working vehicle and a second actuator for influencing the propulsion rate of the working vehicle, and which is able to be operated in order to activate the first actuator and the second actuator in terms of damping the pitching oscillation. To this end, reference might be made to the disclosure of German Patent Appl. No. DE 10 2014 203 005 B3, German Patent Appl. No. DE 10 2014 208 070 A1 and European Patent Appl. No. EP 3 072 379 A1 and the documents cited therein, the contents thereof being fully incorporated by way of reference in the present documentation. The control device is configured to obtain or even to generate an operating mode signal relative to one respective operating mode of the working vehicle, wherein the operating mode comprises at least field work and transport travel, and to generate the control signals to the first actuator and the second actuator as a function of the operating mode signal.

In other words, the present disclosure provides an extension or adaptation of the known controller to the two working modes of transport and harvesting and/or working mode, which have an effect on the limitations and weighting of the activation. As a function of the respectively present operating mode, the regulating concept gives a weighting to the current pitch angle of the machine and the desired position of the adjustable implement and the trajectories thereof and takes into consideration the desired capacity utilization of the actuators in order to calculate suitable control signals. Moreover, control variable limitations, such as for example a permitted movement range for the harvesting attachment or limits to the travel speed changes dictated by comfort and performance, which also result from the present operating mode, are taken into consideration. It is additionally conceivable using a predictive sensor, or with historical data, to incorporate a priori knowledge about the anticipated terrain and to take this knowledge into consideration when activating the actuators.

The control device may be configured to limit the control signals to the first and/or second actuator and/or the temporal change thereof downwardly and/or upwardly as a function of the operating mode signal. Thus, for example, in transport travel a greater control range of the adjustable implement may be provided than in field work, since in the case of field work a more or less high tolerance of a target value has to be maintained for reaching the desired work result, which is not the case in transport travel. Similarly, in transport travel it may be expedient to keep closer to a predetermined speed than in field work, for example to keep to predetermined travel speeds in traffic and to avoid accidents. In the case of emergency braking, whether in field work or transport travel, the dependence of the control signals to the actuator for adjusting the propulsion rate may be provided entirely independently of a damping of the pitching oscillation. Similarly, the temporal derivative of the control signal to the actuator for adjusting the propulsion rate, which represents the acceleration of the working vehicle, may be limited in a manner known per se in order to ensure the travel comfort of the operator (see German Patent Appl. No. DE 10 2014 205 233 A1, the disclosure thereof being incorporated by way of reference in the present documentation). This limitation may apply in field work and be suspended in transport travel.

The control device may be configured to generate the control signals to the first and second actuator and/or the temporal change thereof as a function of target and actual values of the position of the implement and/or the target and actual values of the propulsion rate of the working vehicle and/or target and actual values of the tilt of the working vehicle by a weighting as a function of the operating signal. Thus irrespective of whether the working vehicle is in field work or in transport travel, it is possible to react with a different degree of intensity to a deviation of the position of the implement from a target value, a deviation of the propulsion rate from a target value and/or a deviation of the tilt angle of the vehicle from the target value, in particular in the manner mentioned in the above paragraph.

For example, the control device may be configured in field work to give more weighting to a deviation from the target and actual values of the position of the implement for the activation of the first actuator than for the actuation of the second actuator and/or to give less weighting to a deviation from target and actual values of the propulsion rate of the working vehicle and/or a pitching movement for the activation of the first actuator than for the activation of the second actuator. In field work, accordingly the implement is primarily adjusted for setting the desired position of the implement, and the damping of the pitching movement and/or speed adaptation takes place primarily by the second actuator. In this case, the respective other actuator may be adjusted therewith to a certain suitable level.

The control device may also be configured in transport travel to give more weighting to a pitching movement for the activation of the first actuator than for the activation of the second actuator. In this case, therefore, the first actuator primarily serves for damping the pitching movement, whilst the position of the implement which in transport travel is not required for cultivation, apart from maintaining lower and upper limits, does not serve as an input variable for the control device, and an adaptation of the propulsion rate to a target value takes place (only) by the second actuator.

The control device may be configured to derive the operating mode signal using the activation of the harvesting units, the level of the travel speed, the position of the harvesting attachment, the position of a road/field switch or the GPS position, or to obtain it from a different device which generates the operating mode signal in the described manner.

Working Vehicle

The working vehicle may be designed in the form of a self-propelled harvesting machine, in particular in the form of a combine harvester or forage harvester having an adjustable implement designed as a harvesting attachment.

Figure 1:
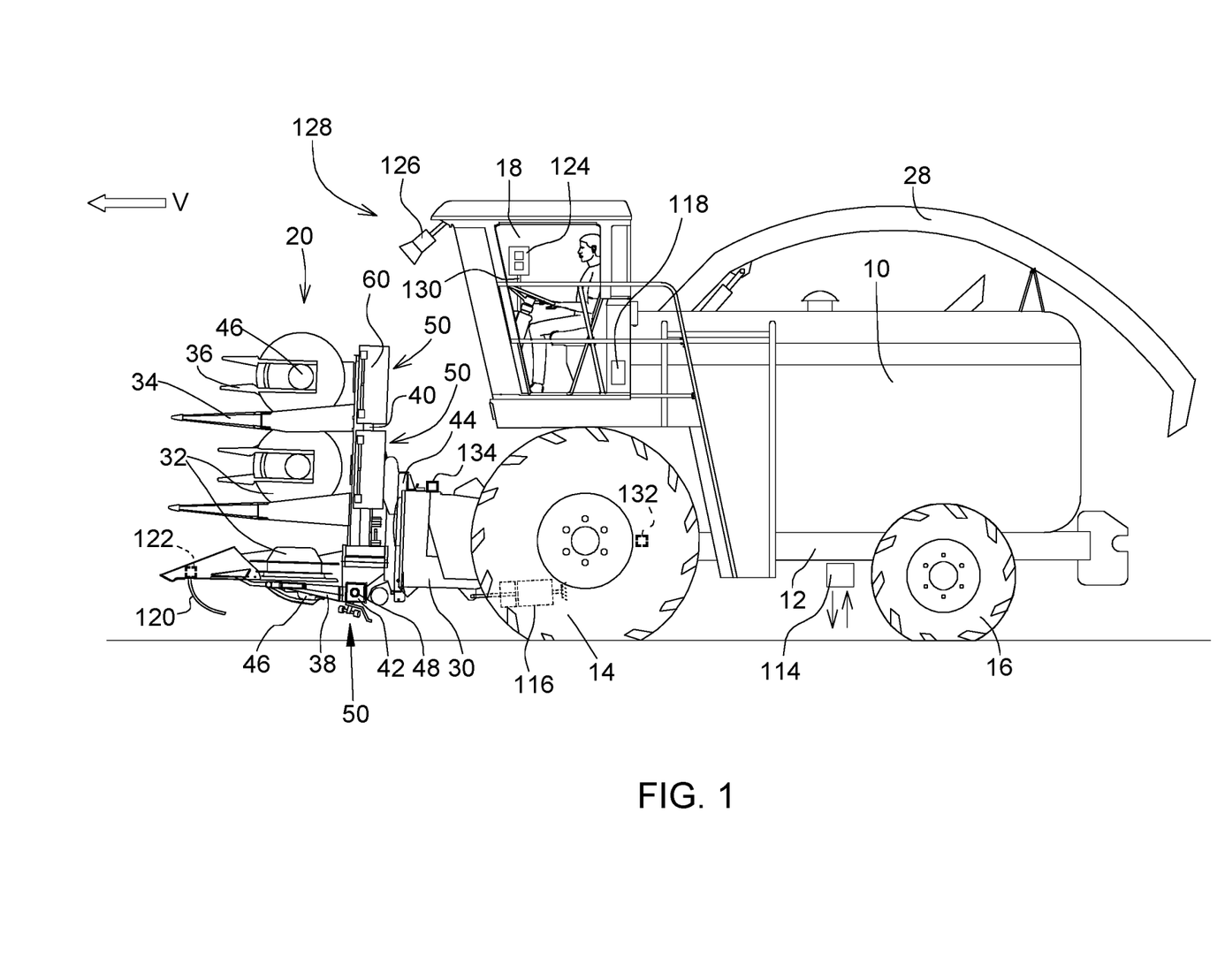
FIG. 1 shows a schematic side view of a working vehicle with an adjustable implement in transport travel.

FIG. 1 shows a self-propelled agricultural working vehicle 10 in the form of a forage harvester with a load-bearing structure 12 which is provided with wheels 14, 16 which are in engagement with the soil. The front wheels 14 are drivable and the rear wheels 16 are steerable. Whilst the working vehicle 10 is shown with wheels 14, 16, it could also be provided with two or four crawler track assemblies.

The operation of the working vehicle 10 is carried out from a driver's cab 18, a harvesting attachment 20 being able to be seen therefrom. Crops, for example maize, picked up from the ground by the harvesting attachment 20 are supplied via a feed housing 30 to a chopper drum, not illustrated, in the interior of the working vehicle 10, which chops the crops into small pieces and discharges the crops to a conveying device (also not illustrated). The crops pass from the working vehicle 10 to a trailer, traveling adjacent thereto and generally towed by a tractor, via a discharge spout 28 which is rotatable about the vertical axis and height-adjustable. A chopping device, not illustrated, may be arranged between the chopper drum and the conveying device. Whilst the disclosure is shown here on a forage harvester, it may also be used on combine harvesters with associated harvesting attachments, in the form of maize picker-huskers or cutting tools, which may be folded up into a transport position in order to be able to leave the harvesting attachment 20 on the working vehicle 10 even when transported on a road, without it being removed from the feed housing 30, and being towed behind the working vehicle 10. A further example of a harvesting attachment 20 might be a pick-up unit which may be used on a forage harvester or combine harvester, whether in a version which is fixed or able to be folded in for transport travel. Hereinafter, directional information such as front, rear, lateral and above refer to the forward direction V of the working vehicle 10 and the harvesting attachment 20 which runs to the left in FIG. 1.

Harvesting Attachment

The harvesting attachment 20 which is fastened to the front face of the working vehicle 10 in the forward direction serves for picking up the harvested crops. The harvesting attachment 20 in the embodiment shown is a maize harvesting attachment, known per se, which comprises a central part 38 and two side parts 40 arranged (relative to the forward direction V of the working vehicle 10) laterally to the left and right adjacent to the central part 38. The side parts 40 are fastened to the central part 38 so as to be pivotable upwardly for road transport and may be pivoted down hydraulically for harvesting use, so that during harvesting mode they run parallel to the central part 38. Subsequently, they may be pivoted up again. FIG. 1 shows the side parts 40 in the pivoted-up state for transport travel in which the working vehicle 10 travels from the farmyard to the field or from one field to another field or back again to the farmyard, whilst in FIG. 2 the side parts are shown in the pivoted-down harvesting position. In the present embodiment, four harvesting units 32 with lower cutting disks for cutting off the plants and upper conveying disks for removing the plants are attached to the central part 38 and, in one example, two harvesting units 32 are attached to both side parts 40. The number and size of harvesting units 32, however, may also be variable and further external parts may also be pivotably attached to the side parts 40.

The harvesting attachment 20 is provided in a manner known per se with crop dividers 36, harvesting units 32, dividing points 34, cover plates and a conveyor, in order to supply the harvested crops to the chopper drum of the working vehicle 10. During operation, the harvesting attachment 20 pulls the stalks of the crops to be harvested into the vertical position, cuts the stalks off and supplies them via transverse conveying drums and discharge conveying drums to the feed housing 30 which is provided with feed rollers and then to the chopper drum of the working vehicle 10 (see European Patent Appl. No. EP 0 760 200 A1).

The harvesting attachment 20 comprises a support frame which has a lower transverse member 42 and an upper transverse member 44. The lower transverse member 42 extends at the bottom on the rear face of the harvesting attachment 20 and comprises three segments, in each case one thereof being assigned to the central part 38 and one to each side part 40. Transmission housings 46 which serve for driving one respective harvesting unit 32 are screwed onto the front face of the lower transverse member 42. A drive shaft 48 for driving the harvesting units 32 via transmissions arranged in the transmission housings 46, which also serves for driving the conveyor of the harvesting attachment 20 and which is driven by an output shaft of the working vehicle 10, extends in the lateral direction inside the hollow lower transverse member 42.

The upper transverse member 44 extends in the lateral direction above the inlet of the feed housing 30 over the width thereof. The upper transverse member is connected to hook-shaped supporting elements which are partially engaged from below by complementary supporting elements of the feed housing 30 and serve for fastening the harvesting attachment 20 to the working vehicle 10. The upper transverse member is connected by vertically extending supports and connecting plates to the lower transverse member 42. The supporting frame with the transverse members 42, 44 and the vertically extending supports and connecting plates thus form a framework of the harvesting attachment 20 which bears all further elements of the harvesting attachment 20. To the rear of each harvesting unit 32 in each case a mulching device 50 is attached below a cover 60.

Control Device, Damping of Pitching Oscillations

Figure 2:
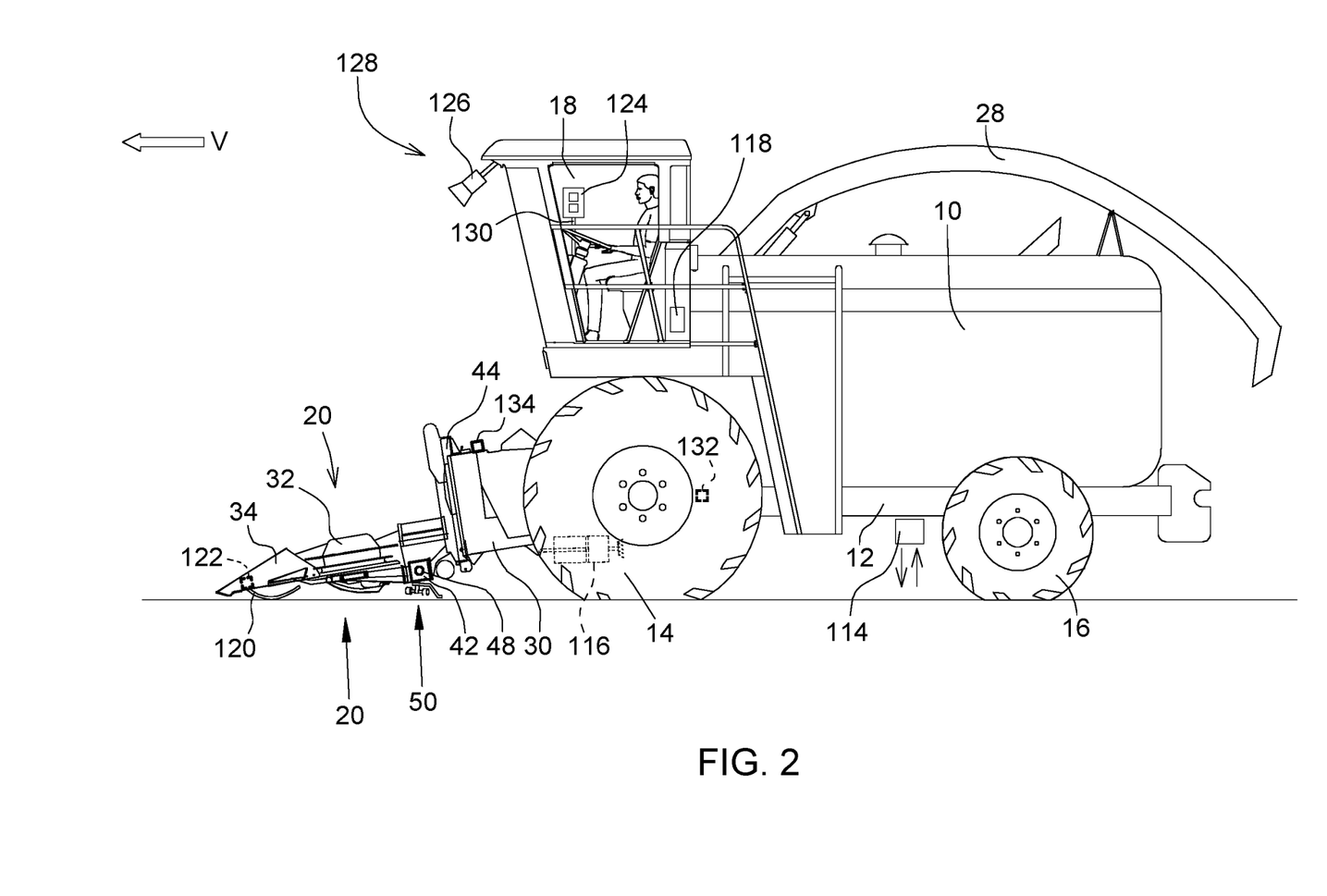
FIG. 2 shows a view of the working vehicle of FIG. 1 in field work.

FIG. 2 shows the harvesting attachment 20 in a position which it adopts during harvesting, for which purpose the feed housing 30 is lowered by a first actuator 116 controlled by a control device 118 about the rotational axis of the chopper drum from the transport position, shown in FIG. 1, after the side parts 40 have been pivoted downwardly. This first actuator 116 also controls the height of the harvesting attachment 20 above the ground, on the basis of one or more height sensor(s) 122 which cooperate in each case with a ground sensor 120. A speed sensor 114 which may be designed, in particular, as a radar sensor, detects the propulsion rate of the working vehicle 10. In field work, the working vehicle 10 is accordingly configured as in FIG. 2, i.e. the harvesting attachment 20 is folded out and lowered into a working position, whilst in transport travel the working vehicle is configured as in FIG. 1 with the harvesting attachment 20 lifted and folded-in. The shifting between the two configurations may be carried out by the input of the operator in an interface or automatically, for example based on the position of the working vehicle 10 on a field or a road.

The height control of the harvesting attachment 20, which in the present embodiment serves as an example of an adjustable implement of the working vehicle 10, is accordingly carried out by the first actuator 116 in the form of a hydraulic cylinder which adjusts the feed housing 30 with the harvesting attachment 20 fastened thereto about the rotational axis of the chopper drum oriented transversely to the forward direction V and horizontally, and thus defines the spacing between the harvesting attachment 20 and the soil. The first actuator 116 is controlled by the control device 118. The desired (target) height of the harvesting attachment 20 is predetermined by an operator interface 124 with buttons which are attached to the upper end of a control lever 130, which is pivotably articulated and serves for predetermining the propulsion rate of the working vehicle 10. Additionally, a predictive sensor system 128 with a camera 126 is mounted on the roof of the cab 18, in order to detect an image of the field upstream of the working vehicle 10, so as to obtain therefrom data regarding the planting density and predictive values derived therefrom for the control device 118. The sensor system 128 could also be configured for detecting the contour of the ground which could be carried out, for example, by a scanning radar sensor. The height sensor 122 cooperating with a ground sensor 120 additionally detects the actual height of the harvesting attachment 20 above the ground. The sensor system 128 and the height sensor 122 are required, in particular, for the automatic height adjustment of the harvesting attachment 20.

When changing the position and location of the harvesting attachment 20 (for example lifting and lowering, in a further embodiment additionally lateral tilting and/or tilting about an axis extending horizontally and transversely to the forward direction V relative to the feed housing 30) excitation torques and excitation forces are produced when changing the target position values of the harvesting attachment 20, said excitation torques and excitation forces being transmitted to the working vehicle 10 which stands on large-volume tires and which is supported by resilient elements (namely the tires) on the ground. In this case, due to the large-volume tires the system consisting of the working vehicle 10 with the harvesting attachment 20 is excited to mechanical oscillations which negatively influence the accuracy of the vertical position and the tilting of the harvesting attachment 20—relative to the ground. Depending on the type of excitation forces and excitation torques, the harvesting machine attachment unit is excited to oscillations of variable frequency, damping and amplitude. To a certain extent, resonance frequencies of the harvesting machine attachment unit are also excited in this case, so that powerful natural oscillations may be produced. These oscillations counteract the goal of a uniform cutting height of the harvested crops and impair the result of regulating the height of the attachment. The aforementioned oscillations lead to the working vehicle 10 together with the harvesting attachment 20 tilting to the front and to the rear, i.e. performing pitching oscillations.

Such pitching oscillations are also produced when the propulsion rate of the working vehicle 10 is changed by manual adjustment of the control lever 130 by the operator or an automatic system, which aims to keep the throughput constant through the working vehicle 10 (for example based on the signals of the sensor system 128), or when the working vehicle 10 travels over uneven ground. In the case of working vehicles with (hydraulically or mechanically) sprung wheels or crawler track assemblies, similar pitching oscillations may be produced even if the ground engagement system, i.e. in particular the crawler track assemblies, are only slightly sprung or entirely unsprung.

Regulating circuits are provided with a sensor for detecting the respective position of the adjustable implement, the signal thereof serving for feeding back the actual position of the implement to a regulating circuit (see for example US Patent Publ. No. 20090277145 A1 for a height adjustment of a harvesting attachment of a combine harvester). As a result, whilst possible deviations of the implement from its target position, also caused amongst other things by the pitching oscillation of the working vehicle, are detected and fed back to the regulating circuit, in order to keep the harvesting attachment at its desired height above the ground ("following the ground"), in the case of potential pitching oscillations of the system consisting of the harvesting machine and the harvesting attachment, no systematic damping of this pitching oscillation is carried out. During harvesting mode, the induced pitching oscillations in combination with the operation of the automatic ground following unit may lead to an undulating cutting action, since a correction of the position of the harvesting attachment may lead to the swinging-up and/or continuous oscillations of the harvesting machine, due to a change in the pitch angle.

For damping the pitching oscillations of a tractor with an articulated plow it has been proposed in the case of road travel to damp actively the lifted plow, by force changes caused by pitching oscillations being detected by sensors for the loading of the front axle, the tractive force or the pressure in a hydraulic cylinder, and being used for activating the hydraulic cylinder serving for the height adjustment of the plow (German Patent Appl. No. DE 34 46 811 A1). The pitching oscillation of the system consisting of the plow and tractor is accordingly damped by a suitable height adjustment of the plow which counteracts the oscillation. In a similar manner, in German Patent Appl. No. DE 10 2010 017 459 A1 it is proposed to detect possible oscillations of a discharge spout of a forage harvester by a sensor for detecting the position of the discharge spout relative to the forage harvester or the pressure in the hydraulic cylinder serving for the height adjustment of the discharge spout, in order to identify possible pitching oscillations of the forage harvester and activate the hydraulic cylinder counter to the oscillation if required.

A reduction in the pitching oscillations of agricultural working machines caused by an adjustment of the harvesting attachment or the ground profile may in the case of field work also be carried out by a suitable activation in phase opposition of the actuator for the height adjustment of the harvesting attachment (German Patent Appl. No. DE 10 2014 203 005 B3, and German Patent Appl. No. DE 10 2014 208 070 A1), by a pitching oscillation produced by adjusting the harvesting attachment or ground unevenness being canceled out by an artificially induced movement in phase opposition of the harvesting attachment. Accordingly, it is known per se to damp possible pitching oscillations of a system consisting of a working vehicle and an implement which is adjustable relative thereto in terms of height by a suitable height adjustment of the adjustable implement, whether in field work or in road travel. Such a procedure is limited, however, when during the working process the position of the implement is intended to remain within a defined range, for example if the height-adjustable implement is a harvesting attachment which is intended neither to penetrate the ground nor cut above the ears of the grain, or is intended to maintain a specific plowing depth.

A further approach for damping said pitching oscillations is to change the propulsion rate of the working vehicle (European Patent Appl. No. EP 3 072 379 A1), by the vehicle being accelerated when it tilts to the front and being decelerated when it tilts to the rear in order to damp or to cancel out the pitching oscillation. Moreover, in addition to intervening in the travel speed, a control of the position of the attachment for the purpose of damping the pitching oscillation is disclosed herein. The activation may take place via separate regulating circuits or a multi-variable regulator.

Figure 3A:
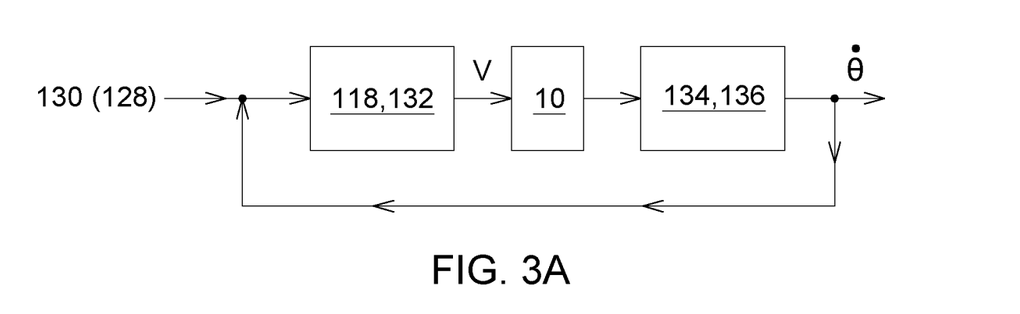
FIG. 3A shows a schematic view of a first embodiment of an arrangement for controlling the propulsion rate and the height of the harvesting attachment of the working vehicle of FIG. 1, by damping pitching oscillations.

FIG. 3A shows schematically for the purposes of the description an arrangement for damping such a possible pitching oscillation. In FIG. 3A a regulating circuit is shown in which the output signal of the control lever 130 (or an automatic system mentioned in the above paragraph for predetermining speed) serves as the input signal. After deducting a regulating variable, described further below, the input signal is supplied to the control device 118 which in turn controls the transmission ratio of a second actuator 132 in the form of a hydrostatic drive, which drives the front wheels 14 and serves as an actuator for influencing the propulsion rate of the working vehicle 10. The system consisting of the working vehicle 10 and harvesting attachment 20 thus travels at a specific speed, which is potentially accelerated or decelerated. The speed changes lead to the described pitching oscillations. The control device 118 is connected to a sensor 134 which is at least one of a vibration sensor, acceleration sensor or inertial sensor and which is attached to the feed channel 30 or any other point of the working vehicle 10 or the harvesting attachment 20. Moreover, the control device 118 is connected to a pressure sensor 136 which detects the pressure in the piston chamber of the first actuator 116. Using the signals of the sensor 134 and the pressure sensor 136, the control device 118 evaluates the rate of change ($\delta\Theta/\delta t$) of the tilt angle of the working vehicle 10 and/or the harvesting attachment 20 in the forward direction. This rate of change is deducted as a regulating variable from the input variable of the regulating circuit. Thus, the propulsion rate of the working vehicle is controlled by the control device 118 in the sense of damping a pitching oscillation. In this case, the sensor 134 and the pressure sensor 136 serve for identifying an existing pitching oscillation.

Figure 3B:
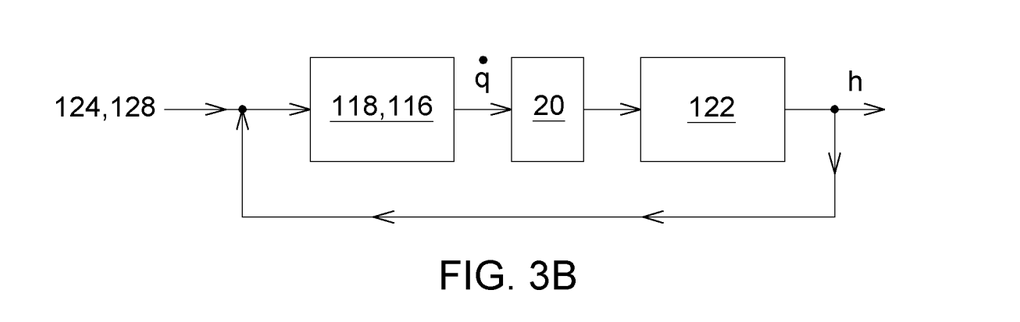
FIG. 3B shows a schematic view of a conventional regulating circuit for the height adjustment of the harvesting attachment.

Moreover, the control device 118 of FIG. 3B comprises a further regulating circuit, the desired cutting height which is predetermined by the user interface 124 or the sensor system 128 being supplied as the input variable thereto. The input signal, after deducting a regulating variable, is supplied to the control device 118, which controls (via valves and pumps, not illustrated) a flow rate ($\delta\Theta/\delta t$) of hydraulic fluid for the first actuator 116. The resulting height of the harvesting attachment 20 is detected by the height sensor 122 and deducted as a regulating variable from the input variable of the regulating circuit. FIG. 3B is a conventional regulating circuit for the height adjustment of the harvesting attachment 20.

Figure 4:
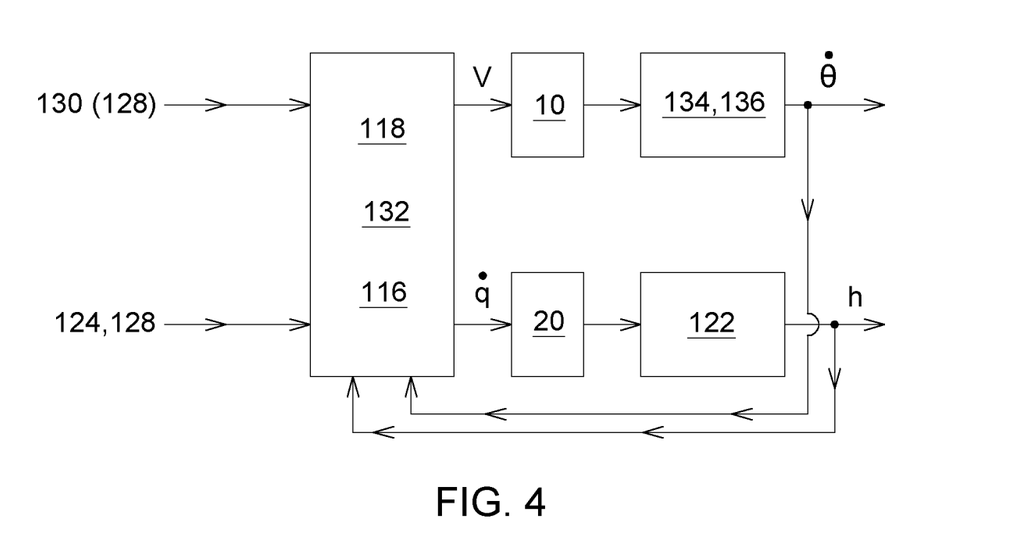
FIG. 4 shows a schematic view of a second embodiment according to the disclosure of an arrangement for controlling the propulsion rate and the height of the harvesting attachment of the working vehicle of FIG. 1, by damping pitching oscillations.

As shown in FIG. 4, the two regulating circuits of FIGS. 3A and 3B may also be combined into one multi-variable regulator, which permits both actuators 116, 132 to be activated, based on both input variables (deviation of the height of the harvesting attachment 10 from a target height and pitching oscillation). This multi-variable regulator is implemented by the control device 118 which obtains as input variables the target speed of the working vehicle and the target height of the harvesting attachment 20, and controls the propulsion rate of the working vehicle 10 via the second actuator 132 and the height of the harvesting attachment 20 via the first actuator 116 as output variables. The rate of change ($\delta\Theta/\delta t$) of the tilt angle of the working vehicle 10 and/or the harvesting attachment 20 in the forward direction is detected by the sensor 134 and/or the pressure sensor 136 and fed back to the control device 118, as is the actual height of the harvesting attachment 20 above the ground detected by the height sensor 122.

In the embodiment according to FIG. 4 there is the possibility that anticipated pitching oscillations, which are caused by a height adjustment of the harvesting attachment 20, are input in an anticipatory manner into the speed controller 118 in order to damp or to eliminate said pitching oscillations. Thus, when lifting the harvesting attachment 20 it has to be taken into consideration that the working vehicle 10 will be tilted to the front which may be compensated by an acceleration. Similarly, when lowering the harvesting attachment 20 it has to be taken into consideration that the working vehicle 10 is tilted to the rear which may be compensated by a deceleration. The predetermined height signal for the harvesting attachment 20 at the input of the controller 118 thus serves to identify an anticipated pitching oscillation of the working vehicle 10.

Similarly the effects of the anticipated speed changes on the height control may be taken into consideration: if the working vehicle 10 is accelerated, the harvesting attachment 20 will be moved upwardly, which may be compensated by the control device 118 and the first actuator 116 by lowering the harvesting attachment 20. If the working vehicle 20 is decelerated, the harvesting attachment 20 will be lowered, which may be compensated by the control device 118 and the first actuator 116 by lifting the harvesting attachment.

Further refinements are possible within the context of the idea underlying the disclosure. Thus the signal to the first actuator 116 for the height control of the harvesting attachment according to the disclosure of German Patent Appl. No. DE 10 2014 203 005 B3, the disclosure thereof being incorporated by way of reference in the present documentation, may be superimposed with a time-delayed, phase-shifted signal, in order to damp oscillations produced when adjusting the harvesting attachment. The method disclosed therein is also possible when controlling the propulsion rate, i.e. a further acceleration takes place after an acceleration (when the working vehicle 10 is tilted to the front after a certain time) and/or a deceleration (when the working vehicle 10 is tilted to the rear) in order to damp the pitching oscillation as quickly as possible. The predetermined speed signal at the input of the controller 118 thus serves to identify an anticipated pitching oscillation of the working vehicle 10. The control device 118 would then comprise a signal former (not shown) which may be operated to forward a received predetermined speed signal to the second actuator 132 and to provide with a time delay a second predetermined speed signal to the second actuator 132, as previously described.

In the case of such a height control of the harvesting attachment 20 and/or the speed control, the control signals to be superimposed may be adapted to the resonance frequencies and damping factors of the harvesting machine attachment unit and thus also to very different attachment-harvesting machine combinations and variable parameters of the tires and ground.

In the case of a hydraulic cylinder 116 working as an actuator, the measurements required therefor are delivered by the pressure sensor 136. Moreover, damping factors and resonance frequencies may also be determined by the sensor 134.

During the height control of the harvesting attachment 20 and during the oscillation-damping speed control, the ground profile upstream of the working vehicle 10 and the interaction thereof with the tires may also be taken into consideration, as described in German Patent Appl. No. DE 10 2014 208 070 A1, the disclosure thereof also being incorporated by way of reference in the present documentation.

The control device 118 of FIG. 4 then obtains two input variables (target speed of working vehicle 10 and target height of harvesting attachment 20) and delivers two control variables (drive 132 and first actuator 116), wherein both input variables influence both control variables, the effects thereof additionally influencing one another directly or indirectly. In the control device 118 optimization methods may be advantageously used which, for example, minimize the drive energy required for the propulsion of the working vehicle 10 and the control energy required for adjusting the actuators 132, 116, in order to obtain by as little energy use as possible an effective damping result and as far as possible correct maintenance of the cutting height. Moreover, by the use of passive and semi-active hydraulic components, such as for example (pneumatic) hydraulic accumulators (see for example German Patent Appl. No. DE 10 2013 213 588 A1, the disclosure thereof being incorporated by way of reference in the present documentation) or components with magneto-rheological fluids, the required energy use may be further reduced.

Taking into Consideration the Operating Mode

Figure 5:
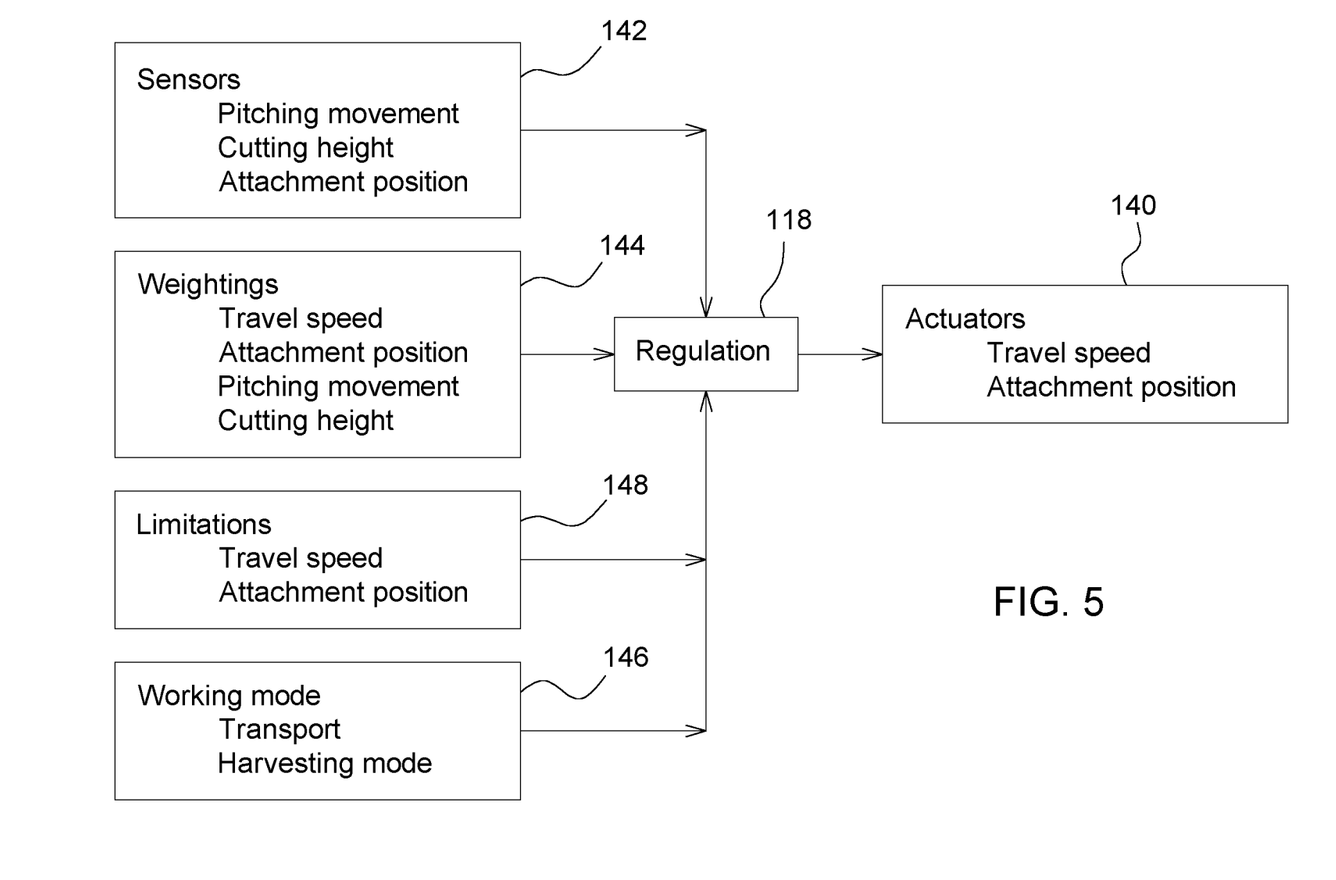
FIG. 5 shows a diagram for illustrating the mode of operation of the control device of the working vehicle as shown in FIG. 4.

Reference is now made to FIG. 5 in which the input variables of the control device 118 and their output variables are shown schematically. The output variables are, as described above, the control signals shown in box 140 to the first actuator 116 for adjusting the height of the harvesting attachment 20 and to the second actuator 132 for the drive of the front wheels 14. The signals of the sensor 134 for the pitching movement, of the height sensor 122 for the height of the harvesting attachment 20 and of the sensor system 128 (and/or the user interface 124) for the target position of the harvesting attachment 20 serve as input signals shown in box 142.

Additionally, the control device 118 is supplied with an operating mode signal which indicates whether the working vehicle 10 is in field mode (FIG. 2) or in transport travel mode (FIG. 1) (box 146). The operating mode signal may be generated, for example, using the position of a switch for shifting between road and field mode, or using a detected or commanded position of the side parts 40 or using the speed of the working vehicle (speed sensor 114).

Moreover, the control device 118 is supplied with information regarding limit values (box 148) which have been previously stored, for example in the factory, and relate to limits of the propulsion rate and the position of the harvesting attachment 20. These may depend in each case on the operating mode. Additionally, limit values of the temporal derivative of the adjustment speeds for the actuators 116 and 132 may be stored, i.e. maximum and minimum values of the acceleration of the height adjustment of the harvesting attachment 20 and the acceleration of the working vehicle 10. These may also be dependent on the operating mode or independent thereof.

Finally, the control device 118 will be supplied with information regarding weightings (box 144) which have been previously stored, for example in the factory, and relate to with which weighting the first and second actuators 116, 132 are intended to be activated, i.e. which first actuator 116, 132 is intended to be actuated and how powerfully, in order to achieve a specific cutting height of the harvesting attachment 20 and/or to damp a specific pitching movement.

According to FIG. 4, the control device 118 during operation then takes into consideration the operating mode signal (box 146), the weightings (box 144) and the limit values (box 148) in order to adapt the control signals to the actuators 116, 132 to the current operating mode.

It is provided, for example, that in transport travel (FIG. 1) the first actuator 116 may be adjusted virtually to any extent, since the harvesting attachment 20 does not interact with the harvested crops, so that the actuator may be adjusted relatively far between a lower and an upper limit in which the harvesting attachment strikes neither against the ground nor a part of the working vehicle 10. In field work (FIG. 2), however, the first actuator 116 is adjusted within relatively small limits, since the harvesting attachment 20 is intended neither to penetrate into the ground nor to cut off the plants too high, since in the first case the harvesting attachment may be damaged and in the second case undesired losses ensue.

Similarly, in transport travel (FIG. 1) the second actuator 132 may be adjusted so as to deviate only to a small degree from a predetermined value, since otherwise accidents could occur. In field work, however, the possible variation of the adjustment of the second actuator 132 is substantially greater, since an upper limit is only predetermined by the drive power of the drive motor of the working vehicle. An adaptation of the speed of a transport vehicle, onto which the harvested crops are loaded by the discharge spout 28, to the variable speed of the working vehicle 10 is possible in a simple manner using previous attempts (see for example WO 2013/151619 A2). Additionally, the adjustment of the second actuator 132 at least in field work is preferably limited by a maximum positive and negative acceleration, in order to ensure the comfort of the operator in the cab 18. In transport travel, this limitation may be dispensed with, at least during deceleration.

Due to the variable activation capacities of the first and second actuators 116, 132, in the different operating modes the different weightings (box 144) may also be used by the control device 118.

In field operating mode, for changing the target or actual value of the cutting height the control device 118 will primarily adjust the first actuator 116 in order to achieve as quickly as possible that the target and actual values coincide, and/or the harvesting attachment is guided over the contour of the ground above the ground by a target value within a permitted tolerance range. The target and actual value of the cutting height is thus incorporated with a very high weighting into the signal for the first actuator 116, whilst the second actuator 132 is only adjusted slightly or not at all, so that the cutting height is incorporated with relatively little weighting into the activation of the second actuator 132. Similarly, in field operating mode the control device 118 will react to a pitching movement identified by the sensor 134 and/or 136 or a deviation between the target and actual value of the propulsion rate, primarily with an adjustment of the second actuator 132 (taking into consideration the pitching movement or speed deviation from the target value, therefore, with greater weighting when activating the second actuator 132), but will not adjust the first actuator 116 or only slightly (giving less weighting to the pitching movement, therefore, when activating the first actuator 116).

In transport travel, however, the control device 118 will take into consideration the height of the harvesting attachment 20 only in the sense of maintaining the limit values (box 148). The target and actual value of the cutting height is thus not incorporated into the signal for the first actuator 116, which also applies to the second actuator 132. Similarly, in transport travel, the control device 118 will react to a pitching movement identified by the sensor 134 and/or 136, primarily with an adjustment of the first actuator 116 (giving more weighting to the pitching movement, therefore, when activating the first actuator 116) but will not adjust the second actuator 132 or only slightly (thus giving more weighting to the pitching movement when activating the second actuator 132). In the case of emergency braking (identifiable by a relatively rapid adjustment of the control lever 130, see European Patent Appl. No. EP 1 743 823 A1)

even the adjustment of the travel speed is switched off as a function of the pitching movement and the full compensation of the pitching movement carried out by changing the position of the harvesting attachment 20.

As a result, an optimized adaptation of the regulating strategy for the first and second actuators 116, 132 is obtained as a function of the operating mode.

Additional Considerations

In a further embodiment, the adjustable implement is a working implement attached to a front or rear power lift of a tractor or a spraying boom, which is height-adjustable and/or pivotable about an axis extending in the forward direction, of a self-propelled field sprayer or a discharge spout of a forage harvester which is adjustable about a vertical and/or horizontal axis.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency trade-offs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the systems, methods, processes, apparatuses and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the systems, apparatuses, devices, methods and/or processes via the use of block diagrams, schematics, flowcharts, examples and/or functional language. Insofar as such block diagrams, schematics, flowcharts, examples and/ or functional language contain one or more functions and/or operations, it will be understood by those within the art that each function and/or operation within such block diagrams, schematics, flowcharts, examples or functional language can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the signal bearing medium used to carry out the distribution. Examples of a signal bearing medium include, but are not limited to, the following: a computer readable memory medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components associated with, comprised of, contained within or connected with different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two or more components herein combined to achieve a particular functionality can be seen as "associated with" each other such that the desired functionality is achieved, irrespective of architectures or intermediate components. Likewise, any two or more components so associated can also be viewed as being "operably connected", or "operably coupled", to each other to achieve the desired functionality, and any two or more components capable of being so associated can also be viewed as being "operably couplable", to each other to achieve the desired functionality. Specific examples of operably couplable include, but are not limited to, physically mateable and/or physically interacting components, and/or wirelessly interactable and/or wirelessly interacting components, and/or logically interacting and/or logically interactable components.

Unless specifically stated otherwise or as apparent from the description herein, it is appreciated that throughout the present disclosure, discussions utilizing terms such as "accessing," "aggregating," "analyzing," "applying," "brokering," "calibrating," "checking," "combining," "communicating," "comparing," "conveying," "converting," "correlating," "creating," "defining," "deriving," "detecting," "disabling," "determining," "enabling," "estimating," "filtering," "finding," "generating," "identifying," "incorporating," "initiating," "locating," "modifying," "obtaining," "outputting," "predicting," "receiving," "reporting," "retrieving," "sending," "sensing," "storing," "transforming," "updating," "using," "validating," or the like, or other conjugation forms of these terms and like terms, refer to the actions and processes of a control unit, computer system or computing element (or portion thereof) such as, but not limited to, one or more or some combination of: a visual organizer system, a request generator, an Internet coupled computing device, a computer server, etc. In one example, the control unit, computer system and/or the computing element may manipulate and transform information and/or data represented as physical (electronic) quantities within the control unit, computer system's and/or computing element's processor(s), register(s), and/or memory(ies) into other data similarly represented as physical quantities within the control unit, computer system's and/or computing element's memory(ies), register(s) and/or other such information storage, processing, transmission, and/or display components of the computer system(s), computing element(s) and/or other electronic computing device(s). Under the direction of computer-readable instructions, the control unit, computer system(s) and/or computing element(s) may carry out operations of one or more of the processes, methods and/or functionalities of the present disclosure.

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific embodiments and applications, persons skilled in the art can, considering this teaching, generate additional embodiments without exceeding the scope or departing from the spirit of the present disclosure described herein. Accordingly, it is to be understood that the drawings and description in this disclosure are proffered to facilitate comprehension of the present disclosure and should not be construed to limit the scope thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

It should also be noted that the different examples described herein can be combined in different ways. That is, parts of one or more examples can be combined with parts of one or more other examples. All of this is contemplated herein.

Example 1 is an apparatus for damping a pitching oscillation of a working vehicle comprising:
 a first actuator for adjusting the position of an implement couple to the working vehicle;
 a second actuator for adjusting the propulsion rate of the working vehicle;
 a control device in communication with the first and second actuators, the control device configured to receive an operating mode signal corresponding to an operating mode of at least one of the working vehicle and implement, and to generate control signals to the first actuator and the second actuator as a function of the operating mode signal.

Example 2 is the apparatus for damping a pitching oscillation of a working vehicle of any or all previous examples and further comprising wherein the control device is configured to adjust characteristics of the control signals to the first and second actuators as a function of the operating mode signal.

Example 3 is the apparatus for damping a pitching oscillation of a working vehicle of any or all previous examples and further comprising wherein the control device is configured to adjust characteristics of the control signals to the first and second actuator as a function of target and actual values of the position of the implement and the operating mode signal.

Example 4 is the apparatus for damping a pitching oscillation of a working vehicle of any or all previous examples and further comprising wherein the control device is configured to adjust characteristics of the control signals to the first and second actuator as a function of target and actual values of the propulsion rate of the working vehicle and the operating mode signal.

Example 5 is the apparatus for damping a pitching oscillation of a working vehicle of any or all previous examples and further comprising wherein the control device is configured to adjust characteristics of the control signals to the first and second actuator as a function of target and actual values of a tilt of the working vehicle and the operating model signal.

Example 6 is the apparatus for damping a pitching oscillation of a working vehicle of any or all previous examples and further comprising wherein the operating mode signal has a field mode and a transport travel mode.

Example 7 is the apparatus for damping a pitching oscillation of a working vehicle of any or all previous examples and further comprising wherein the operating mode signal is the field mode and the control device is configured to adjust characteristics of the control signals by increasing a weighting to a deviation from target and actual values of the position of the implement for the activation of the first actuator than for the activation of the second actuator.

Example 8 is the apparatus for damping a pitching oscillation of a working vehicle of any or all previous examples and further comprising wherein the operating mode signal is the field mode and the control device is configured to adjust characteristics of the control signals by decreasing a weighting to a deviation from target and actual values of the propulsion rate of the working vehicle for the activation of the first actuator than for the activation of the second actuator.

Example 9 is the apparatus for damping a pitching oscillation of a working vehicle of any or all previous examples and further comprising wherein the operating mode signal is the transport travel mode and the control device is configured to adjust characteristics of the control signals by increasing a weighting to a pitching movement for the activation of the first actuator than for the activation of the second actuator.

Example 10 is the apparatus for damping a pitching oscillation of a working vehicle of any or all previous examples and further comprising wherein the control device is configured to derive the operating mode signal using at least one of the activation of an implement unit, travel speed of the working vehicle, position of the implement and a GPS position of at least one of the working vehicle and implement.

Example 11 is the apparatus for damping a pitching oscillation of a working vehicle of any or all previous examples and further comprising wherein the working vehicle is a self-propelled harvesting machine having an adjustable harvesting attachment.

Example 12 is a non-transitory computer-readable storage medium comprising computer program instructions for damping a pitching oscillation of a working vehicle that, when executed by a computer processor, cause the processor to:
  generate an operating mode signal corresponding to an operating mode of the working vehicle;
  generate a control signal using the operating mode signal and transmitting the control signal to a first actuator, the first actuator adjusting the position of an implement coupled to the working vehicle; and
  generate a control signal using the operating mode signal and transmitting the control signal to a second actuator, the second actuator adjusting the propulsion rate of the working vehicle.

Example 13 is the non-transitory computer readable storage medium of any or all previous examples and further comprising instructions that cause the processor to: determine an operating mode of the working vehicle.

Example 14 is the non-transitory computer readable storage medium of any or all previous examples and further comprising instructions that cause the processor to: adjust characteristics of the control signals to the first and second actuator as a function of target and actual values of the position of the implement and the operating mode signal.

Example 15 is the non-transitory computer readable storage medium of any or all previous examples and further comprising instructions that cause the processor to: adjust characteristics of the control signals to the first and second actuator as a function of target and actual values of the propulsion rate of the working vehicle and the operating mode signal.

Example 16 is the non-transitory computer readable storage medium of any or all previous examples and further comprising instructions that cause the processor to: adjust characteristics of the control signals to the first and second actuator as a function of target and actual values of a tilt of the working vehicle and the operating model signal.

Example 17 is the non-transitory computer readable storage medium of any or all previous examples and further comprising instructions that cause the processor to: generate an operating mode signal corresponding to at least one of a field mode and a transport travel mode.

Example 18 is the non-transitory computer readable storage medium of any or all previous examples and further comprising instructions that cause the processor to: when the operating mode signal is the field mode, adjust characteristics of the control signals by increasing a weighting to a deviation from target and actual values of the position of the implement for the activation of the first actuator than for the activation of the second actuator.

Example 19 is the non-transitory computer readable storage medium of any or all previous examples and further comprising instructions that cause the processor to: when the operating mode signal is the field mode, adjust characteristics of the control signals by decreasing a weighting to a deviation from target and actual values of the propulsion rate of the working vehicle t for the activation of the first actuator than for the activation of the second actuator.

Example 20 is the non-transitory computer readable storage medium of any or all previous examples and further comprising instructions that cause the processor to: when the operating mode signal is the field mode, adjust characteristics of the control signals by increasing a weighting to a pitching movement for the activation of the first actuator than for the activation of the second actuator.

Example 21 is the non-transitory computer readable storage medium of any or all previous examples and further comprising instructions that cause the processor to: derive the operating mode signal using at least one of the activation of an implement unit(s), travel speed of the working vehicle, position of the implement and a GPS position of at least one of the working vehicle and implement.

The invention claimed is:

1. An apparatus for damping a pitching oscillation of a working vehicle comprising:
  a first actuator for adjusting a position of an implement coupled to the working vehicle;
  a second actuator for adjusting a propulsion rate of the working vehicle; and
  a controller in communication with the first and second actuators, the controller configured to:
    receive an operating mode signal corresponding to an operating mode of at least one of the working vehicle and the implement, wherein the operating mode includes at least one of a field mode and a transport mode, wherein the field mode corresponds to the working vehicle performing work in a field with the implement in a work position and the transport mode corresponds to the working vehicle traveling with the implement in a raised position;
    generate control signals to the first actuator and the second actuator for damping the pitching oscillation, wherein the control signals are generated based on the operating mode of the working vehicle to dampen the pitching oscillation by at least one of adjusting the position of the implement or adjusting the propulsion rate of the working vehicle; and
    reallocate damping work between the first actuator and the second actuator by adjusting the control signals in order to dampen the pitching oscillation, wherein the control signals are adjusted based on the operating mode of the working vehicle, a limit value, and a weighting value, the limit value to correspond to at least one of a maximum value and a minimum value of the position of the implement and the propulsion rate of the working vehicle, the weighting value to correspond to activation of the first actuator and the second actuator.

2. The apparatus of claim 1, wherein the first actuator is controllable to a target position of the implement based on a target signal, the second actuator is controllable to a target propulsion rate of the working vehicle based on another target signal, and wherein the control signals for damping the pitching oscillation differ from the target signals.

3. The apparatus of claim 1, wherein the controller is also configured to adjust the control signals to the first actuator and the second actuator as a function of target and actual values of the position of the implement.

4. The apparatus of claim 1, wherein the controller is also configured to adjust the control signals to the first actuator and the second actuator as a function of target and actual values of the propulsion rate of the working vehicle.

5. The apparatus of claim 1, wherein the controller is also configured to adjust the control signals to the first actuator and the second actuator as a function of target and actual values of a tilt of the working vehicle.

6. The apparatus of claim 1, wherein the controller is configured to derive the operating mode signal using at least one of activation of an implement unit, a travel speed of the working vehicle, and a position of the working vehicle or the position of the implement.

7. The apparatus of claim 1, wherein the working vehicle is a self-propelled harvesting machine having an adjustable harvesting attachment.

8. A non-transitory computer-readable storage medium comprising computer program instructions for damping a pitching oscillation of a working vehicle that, when executed by a processor, cause the processor to:
determine an operating mode of the working vehicle, wherein the operating mode includes at least one of a field mode and a transport mode, wherein the field mode corresponds to the working vehicle performing work in a field with an implement in a work position and the transport mode corresponds to the working vehicle traveling with the implement in a raised position;
generate an operating mode signal corresponding to at least one of the field mode and the transport mode of the working vehicle;
generate a first control signal, wherein the first control signal is generated based on the operating mode of the working vehicle, and the first control signal is transmitted to a first actuator, the first actuator adjusts a position of the implement coupled to the working vehicle to dampen the pitching oscillation;
generate a second control signal, wherein the second control signal is generated based on the operating mode of the working vehicle, and the second control signal is transmitted to a second actuator, the second actuator adjusts a propulsion rate of the working vehicle to dampen the pitching oscillation; and
reallocate damping work between the first actuator and the second actuator by adjusting at least one of the first control signal and the second control signal to dampen the pitching oscillation, wherein the first control signal and the second control signal are adjusted based on the operating mode of the working vehicle, a limit value, and a weighting value, the limit value to correspond to at least one of a maximum value and a minimum value of the position of the implement and the propulsion rate of the working vehicle, the weighting value to correspond to activation of the first actuator and the second actuator.

9. The non-transitory computer-readable storage medium of claim 8, further including instructions that cause the processor to adjust at least one of the first control signal and the second control signal to the first actuator and the second actuator, respectively, as a function of target and actual values of the position of the implement.

10. The non-transitory computer-readable storage medium of claim 8, further including instructions that cause the processor to adjust at least one of the first control signal and the second control signal to the first actuator and the second actuator, respectively, as a function of target and actual values of the propulsion rate of the working vehicle.

11. The non-transitory computer-readable storage medium of claim 8, further including instructions that cause the processor to adjust at least one of the first control signal and the second control signal to the first actuator and the second actuator, respectively, as a function of target and actual values of a tilt of the working vehicle.

12. The non-transitory computer readable computer-readable storage medium of claim 8, further including instructions that cause the processor to derive the operating mode signal using at least one of activation of an implement unit, a travel speed of the working vehicle, and a position of the working vehicle or the position of the implement.

13. The apparatus of claim 1, wherein, in the transport mode, the controller is configured to favor changing the position of the implement over changing the propulsion rate to dampen the pitching oscillation, and wherein, in the field mode, the controller is configured to favor changing the propulsion rate over changing the position of the implement to dampen the pitching oscillation.

14. The apparatus of claim 1, wherein the controller includes the limit value stored therein for constraining one or more of the propulsion rate, the position of the implement, a rate of change of the propulsion rate, or a rate of change of the position of the implement during specified operating modes, and wherein adjusting the at least one of the control signals includes executing at least one of the stored limit values to constrain capacity utilization of at least one of the first actuator and the second actuator.

15. The apparatus of claim 1, wherein the controller includes the weighting value stored therein informing how capacity of the first actuator and the second actuator is allocated in a specified operating mode, and wherein for reallocating the damping work, the controller includes the limit value stored therein for reallocating capacity utilization of the first actuator and the second actuator based on the operating mode in order to dampen the pitching oscillation in different ways for different operating modes.

16. The apparatus of claim 15, wherein the weighting value favors an implement position target value in the field mode and favors a propulsion rate target value in the transport mode, and wherein the limit value favors changing the propulsion rate over changing the position of the implement to dampen the pitching oscillation in the field mode and favors changing the position of the implement over changing the propulsion rate to dampen the pitching oscillation in the transport mode.

17. The non-transitory computer-readable storage medium of claim 8, wherein, in the transport mode, the processor is caused to favor changing the position of the implement over changing the propulsion rate to dampen the pitching oscillation, and wherein, in the field mode, the processor is caused to favor changing the propulsion rate over changing the position of the implement to dampen the pitching oscillation.

18. The non-transitory computer-readable storage medium of claim 8, wherein the storage medium includes the limit value stored therein for constraining one or more of the propulsion rate, the position of the implement, a rate of change of the propulsion rate, or a rate of change of the position of the implement during specified operating modes, and wherein adjusting the at least one of the first control signal and the second control signal includes executing at least one of the stored limit values to constrain capacity utilization of at least one of the first actuator and the second actuator.

19. The non-transitory computer-readable storage medium of claim 8, wherein the storage medium includes the weighting value stored therein informing how capacity of the first actuator and the second actuator is allocated in a specified operating mode, and wherein for reallocating the damping work, the storage medium includes the limit value stored therein for reallocating capacity utilization of the first actuator and the second actuator based on the operating mode in order to dampen the pitching oscillation in different ways for different operating modes.

20. The non-transitory computer-readable storage medium of claim 19, wherein the weighting value favors an implement position target value in the field mode and favors a propulsion rate target value in the transport mode, and wherein the limit value favors changing the propulsion rate over changing the position of the implement to dampen the pitching oscillation in the field mode and favors changing the position of the implement over changing the propulsion rate to dampen the pitching oscillation in the transport mode.

21. The non-transitory computer-readable storage medium of claim 8, further including instructions that cause the processor to do one or more of the following:
- when the operating mode signal is the field mode, adjust characteristics of the first control signal and the second control signal by increasing a weighting to a deviation from target and actual values of the position of the implement for activation of the first actuator than for activation of the second actuator;
- when the operating mode signal is the field mode, adjust the characteristics of the first control signal and the second control signal by decreasing the weighting to the deviation from target and actual values of the propulsion rate of the working vehicle for activation of the first actuator than for activation of the second actuator; and
- when the operating mode signal is the field mode, adjust the characteristics of the first control signal and the second control signal by increasing the weighting to a pitching movement for activation of the first actuator than for activation of the second actuator.

* * * * *